Aug. 17, 1948.  W. A. WAGNER  2,447,471
VEHICLE PLATFORM
Filed Oct. 30, 1944  2 Sheets-Sheet 1
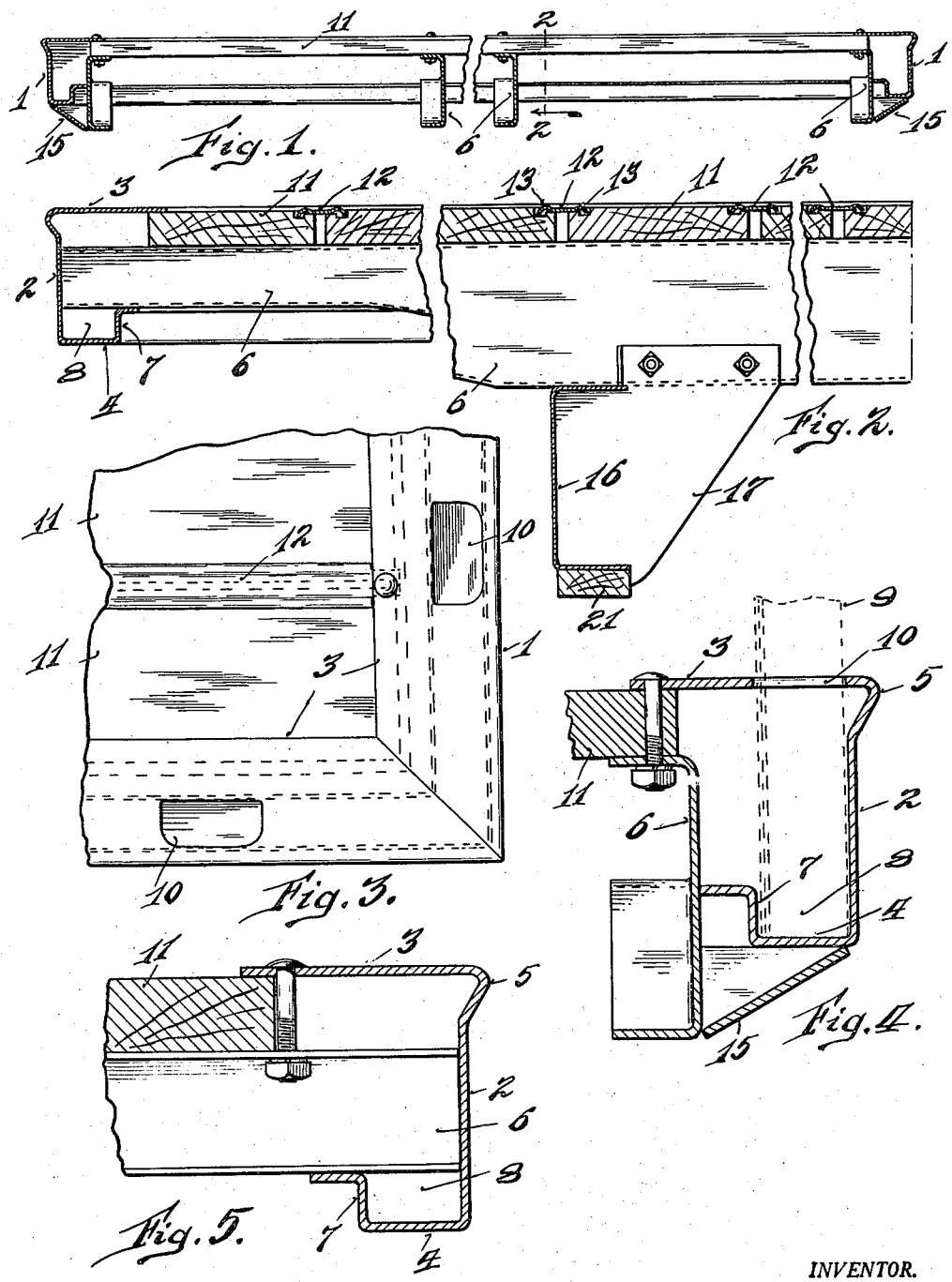
INVENTOR.
William A. Wagner
BY
Oliver B. Kaiser
Atty.

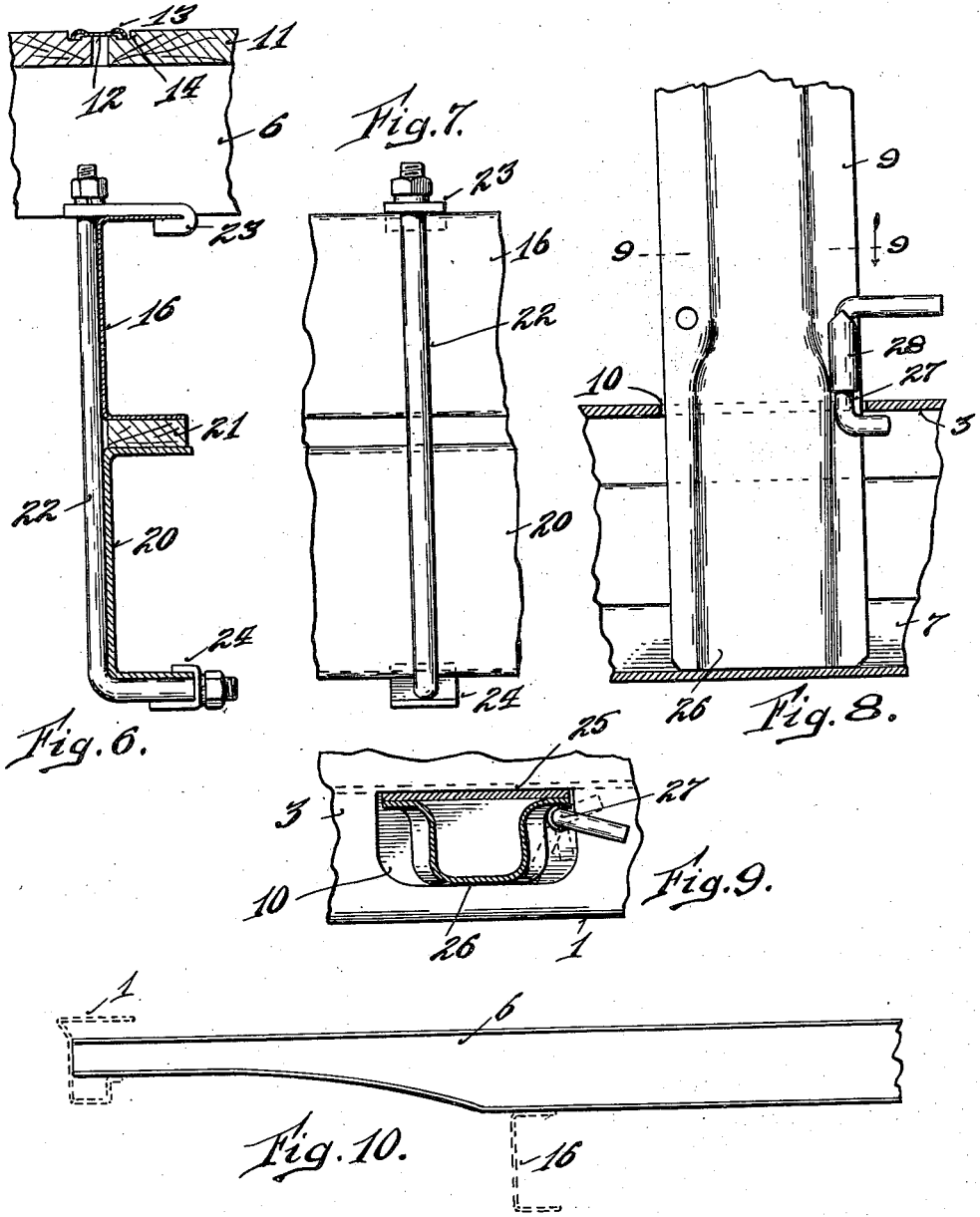

Patented Aug. 17, 1948

2,447,471

UNITED STATES PATENT OFFICE 2,447,471

VEHICLE PLATFORM

William A. Wagner, Galion, Ohio, assignor to The Perfection Steel Body Company, Galion, Ohio, a corporation of Ohio Application October 30, 1944, Serial No. 561,139

2 Claims. (Cl. 296—28)

This invention relates to improvements in vehicle platforms, particularly for the truck class for freight or cargo transportation and adapted for ready mounting upon the chassis framing of a motor driven vehicle or truck.

An object of the invention is to provide a vehicle platform having a frame with the end and side rails thereof of uniform construction, composed of sheet steel fabricated into channel bar form, having one of its flanges terminating with a right-angled or off-set bend, providing a ledge or sill longitudinally of the rails, giving increased stability to the rails and for supporting the ends of bolsters having their ends engaged into the rails and extending perpendicularly of the platform.

Another object is to provide a vehicle truck platform with a channel bar form of frame and channel bar bolsters having tapering ends engaged into the channel of the side rails of the frame providing a structure for reduction in weight and increased load carrying capacity without loss of strength and the tapering end bolsters effecting better wheel clearance and lower platform mounting heighth.

Another object is to provide an efficient means for tying to longitudinal sills as a part of the platform substructure and composed of channel bars to the chassis framing of the vehicle and for convenient adjustment of the platform sills to accommodate for installation on various chassis widths.

Another object is to provide an improved platform stake and means for locking the same to the platform frame.

Various other features and advantages of the invention will be more fully set forth in the following description of the accompanying drawings forming a part of this specification and illustrating a preferred embodiment, in which:

Figure 1 is a section longitudinally of the platform, the section in length being broken.

Figure 2 is an enlarged section on line 2, 2, Figure 1.

Figure 3 is a top plan view of a corner portion of the platform.

Figure 4, is an enlarged section through an end rail of the platform frame.

Figure 5 is an enlarged section through a side rail of the platform frame.

Figure 6 is a cross section through a portion of the platform, the sill as a part of the understructure and a rail of the chassis frame of a truck, illustrating the improved means for tying the parts together.

Figure 7 is a side elevation of the structure shown in Figure 6.

Figure 8 is a front side view of the lower end of a stake engaged and socketed in a rail of the platform frame and the means for locking the stake to the rail.

Figure 9 is a section on line 9, 9, Figure 8.

Figure 10 is a side elevation of one end of a bolster.

The platform, as a freight or cargo carrying medium is applicable to various types of vehicles, as upon the chassis of the commercial auto truck or equipped with wheels for trailer or wagon service and therefore not limited to any particular class of vehicle, although its understructure as exemplified is primarily for installation upon the framing and chassis of an automobile truck.

Referring to the drawings, the platform comprises a frame 1, with the side and end rails thereof of extruded steel or otherwise fabricated bars of uniform cross-section, in general of channel form having a web portion 2 and a pair of opposite flanges 3 and 4 integrally joining with the web. The web provides an outer side facing or edge for the platform with the flange 3 extending at right angles thereto in plane with the top or upper side of the platform. The web at its juncture with the flange 3 is rolled to provide an outwardly extending corrugation or ridge 5 as an auxiliary outside edge, reinforcing and increasing the rigidity of the bar and serving as a rub-rail.

The flange 4, for the bottom side of the frame is off-set form in cross-section, the off-set extending inwardly of the channel of the bar providing a sill or ledge longitudinally of the bar or rail, for supporting an end of each of a series or plurality of determinately spaced bolsters 6, disposed crosswise of the length of the platform. The off-setting of the flange 4, provides a shoulder 7, in parallelism with the web 2, and therewith together with a portion of the flange intermediate of the shoulder and web forming a recess 8, within the channel and longitudinally of the full length of the rail, for socketing and laterally confining the end of a stake 9, engaged into the rail and through a slot or opening 10, in the top flange 3 of the rail.

The off-setting of the flange 4, further serves to reinforce and strengthen the rail, permitting a reduction in gauge of metal and inherently a reduction in the weight of platform, without sacrifice in durability or efficiency.

The structure of the frame permits the stake traversing openings or slots 10, to be located at any selected point and relative spacing apart for the full-length of the rail and for either the end or side rails, which is of material advantage, so that the number can be varied and the relative spacing changed to meet different demands. It also provides for a simple method of locking the stakes to the rails of the frame, which will be hereinafter explained.

The bolsters 6, for the understructure of the platform, constitute channel form of rails, each tapering toward its opposite ends from the bottom side of the bolster, the ends each respectively engaging into the channel of the side rail of the frame and rests upon the ledge thereof formed by the offset in the lower flange 4, of the frame rail. The tapering ends of the bolster reduce or lower the mounting heighth of the platform and offer better wheel clearance. The bolsters can be set at any relative spacing apart, depending upon the length of the platform and load sustaining capacity required, which is due to the uniform cross-sectional formation of the rails of the frame. The ends of the bolsters may be either welded, riveted or otherwise rigidly secured to the side rails of the frame to combine the rails and bolsters as one solid piece.

The floor of the platform is composed of individually removable wood boards or planks 11, resting upon the bolsters and secured or anchored thereto by bolts, centrally traversing metal skid strips 12, extending longitudinally of the floor boards and engaged marginally with a pair of adjoining boards, preferably slightly spaced from one another. The skid or tie strips 12, are ribbed or corrugated longitudinally of their edges adapted each curved edge 13 to be clipped into a groove 14, in the top face of a board and extending longitudinally of its margin. The opposite ends of the boards are tucked into the channel of the end rails of the frame beneath the top flange 3 thereof and this correspondingly follows for outer margin of the end boards of the floor adjoining the side rails of the frame.

As shown in Figures 1 and 4, a bolster 6, immediately adjoins a relative end rail of the frame, with the edge of the bottom flange of an end rail of the frame in abutting contact with the web portion of the bolster and the rail and bolster joined together by an obliquely disposed plate 15 welded thereto. This provides increased rigidity for the end rails of the platform frame capable of withstanding excessive shocks and strains when subjected to obstruction engaging impacts.

The bolsters are superimposed upon a pair of pressed steel sills 16, preferably of channel bar form in cross section, extending longitudinally of the platform. The sills are adjustably connected to the bolsters by plates 17, each of an outline to provide a combined gusset and brace with the gusset portion fitting and engaged into the channel of the sill and welded to the walls thereof. The brace portion of the plate 17, extends outwardly from the inner side of a bolster to which it is adjustably secured. The sills therefore are adjustable to accommodate for various truck frame widths and the gusset portion of the plate 17, is in proximity to a bolster to insure maximum load carrying capacity. The lower end of the brace portion of the plate 17, projects slightly beyond the lower flange of the sill as an edge abutment therefor and the upper end is provided with an angle bend to overlie the top flange of the sill.

In making an installation of the platform upon a truck frame, which usually includes a pair of channel bars 20, the sills of the platform are superimposed upon the channel bars 20 and a wooden sill strip 21, is interposed therebetween. Each sill and its relative truck frame bar are bolted or tied together by an L-form of bolt rod 22, having its upper end traversing a clip 23, extending laterally of the bolt rod to over-lie the top flange of the platform sill 16, with the outer end of the clip of hook form to clasp over the edge of the sill flange. The laterally extended head end of the tie bolt 22, underlies the lower flange of the channel bar of the truck frame and centrally traverses a U-clip 24, engaged over the edge of the flange.

The stake 9, as illustrated in Figures 3 and 9, is of double plate construction, comprising a flat base plate 25, spanning a longitudinally ribbed plate 26. The plates are welded together in ply arrangement, with the base plate when the stake is applied upon the platform exposed innermost. The lower end of the stake when socketed into the platform frame bears against the shoulder 7 of a frame rail and the rib of the second plate bears against the inner side of the web portion 2 of the frame rail.

The stake is locked to the frame by a bolt 27, formed of a rod bent into U-form, with the intermediate shank portion pivotally mounted within a sleeve 28, fixed to the outer side of the stake. The top laterally extended end of the bolt rod provides a handle, and the lower laterally extended end, a lock stud, adapted to be moved to underlie the top flange 3 of the frame rail to resist upward movement of the stake. Upon swinging the lock stud rearwardly against the ribbed side of the stake it is brought within the area of the entrance slot 10, of the frame permitting the stake to be withdrawn.

The upper end of the bolt mounting sleeve 28, is pointed adapting the handle portion of the lock bolt to be latched in either of its alternate lock controlling positions and releasable thereupon by slightly elevating the bolt.

Having described my invention, I claim:

1. In a vehicle platform, a frame, the rails thereof each of channel form in cross-section, providing a pair of flanges extending inward of the frame, one thereof for the lower side of the frame terminating with a right angle bend extending toward the other flange longitudinally of the full length of the rail to provide a ledge inward of the channel of the rail as a bearing for the ends of a plurality of bolsters extending cross-wise of the frame, the ends projecting respectively into the channel of a side rail and said lower flange seating and with its right angle bend laterally confining the ends of stakes, each engaged through a respective aperture in the upper flange at any point longitudinally of the rail.

2. In a vehicle platform, a frame, a plurality of bolsters cross-wise of the frame having their ends fixed respectively to a side rail of the frame, sills, each of channel form in cross-section extending longitudinally of the frame and transverse to the bolsters and in bearing contact with the underside thereof and plates for connecting a sill to the bolsters, each having a portion extending into the channel of the sill and fixed to the walls thereof providing a gusset therefor, a portion of the plate projecting beyond the sill for connection to a bolster and at its lower end having an extension to depend below the sill to cleat a batten strip disposed beneath the sill.

WILLIAM A. WAGNER.

REFERENCES CITED

The following references are of record in the file of this patent:

UNITED STATES PATENTS

| Number | Name | Date |
|---|---|---|
| 335,918 | Gould | Feb. 9, 1886 |
| 842,873 | Dodds | Feb. 5, 1907 |
| 859,555 | Frame | July 9, 1907 |
| 1,110,178 | Bankson | Sept. 8, 1914 |
| 1,402,146 | Davis | Jan. 3, 1922 |
| 1,630,145 | Travis, Jr. | May 24, 1927 |
| 1,652,357 | Harper | Dec. 13, 1927 |
| 1,926,352 | Selzer | Sept. 12, 1933 |
| 1,992,496 | Marmon et al. | Feb. 26, 1935 |
| 2,022,869 | Reid | Dec. 3, 1935 |
| 2,199,886 | Luce | May 7, 1940 |
| 2,322,841 | Foster | June 29, 1943 |
| 2,367,425 | Nilles | Jan. 16, 1945 |

FOREIGN PATENTS

| Number | Country | Date |
|---|---|---|
| 103,398 | Australia | Mar. 3, 1938 |